US008402879B2

(12) United States Patent
Lavergne et al.

(10) Patent No.: US 8,402,879 B2

(45) Date of Patent: Mar. 26, 2013

(54) TOOL FOR SCREWING A PISTON ONTO THE PISTON ROD OF A HYDRAULIC CYLINDER AND HYDRAULIC CYLINDER

(75) Inventors: Hans-Peter Lavergne, Trunkelsberg (DE); Ralph Soell, Dettingen an der Iller (DE); Christoph Guhl, Ochsenhausen (DE)

(73) Assignee: Liebherr-Hydraulikbagger GmbH, Kirchdorf/Iller (DE)

(*) Notice: Subject to any disclaimer, the term of this patent is extended or adjusted under 35 U.S.C. 154(b) by 945 days.

(21) Appl. No.: 12/490,740

(22) Filed: Jun. 24, 2009

(65) Prior Publication Data

US 2010/0018083 A1 Jan. 28, 2010

(30) Foreign Application Priority Data

Jun. 24, 2008 (DE) .................... 20 2008 008 446 U

(51) Int. Cl.
*F16J 1/12* (2006.01)
*B25B 13/50* (2006.01)

(52) U.S. Cl. .......................... 92/128; 92/255; 81/176.15

(58) Field of Classification Search .................... 92/128, 92/255; 81/176.15

See application file for complete search history.

(56) References Cited

U.S. PATENT DOCUMENTS

| | | | | |
|---|---|---|---|---|
| 2,898,793 | A | | 8/1959 | Fedeson |
| 3,885,461 | A | * | 5/1975 | Crisp et al. ...................... 92/255 |
| 4,086,844 | A | * | 5/1978 | Homuth .......................... 92/249 |
| 4,483,220 | A | * | 11/1984 | Shindelar ........................ 81/100 |
| 4,815,360 | A | * | 3/1989 | Winterle .......................... 92/255 |
| 4,917,003 | A | * | 4/1990 | Kollross .......................... 92/256 |
| 5,201,256 | A | * | 4/1993 | Schneider et al. ........... 81/57.34 |
| 5,509,382 | A | * | 4/1996 | Noland ........................... 123/66 |
| 5,546,833 | A | * | 8/1996 | Holdeman et al. ........... 81/57.34 |

FOREIGN PATENT DOCUMENTS

| | | | |
|---|---|---|---|
| DE | 10006674 | | 8/2001 |
| DE | 102005003762 | | 8/2006 |
| DE | 102005003762 | A1 * | 8/2006 |
| FR | 2687343 | | 8/1993 |
| WO | 2008/051615 | | 5/2008 |

OTHER PUBLICATIONS

ISA German Patent and Trademark Office, Search Report of 20 2008 008 446.6, Jul. 16, 2009, 4 pages.

* cited by examiner

*Primary Examiner* — Thomas E Lazo

(74) *Attorney, Agent, or Firm* — Alleman Hall McCoy Russell & Tuttle LLP

(57) ABSTRACT

The present invention relates to a tool for screwing a piston onto the piston rod of a hydraulic cylinder, in particular of a hydraulic cylinder with a piston diameter of more than 200 mm, comprising a first tool element with connecting elements for releasable connection with the piston and a second tool element with connecting elements for releasable connection with the piston rod, which is rotatable with respect to the first tool element, wherein the torque necessary for screwing together piston and piston rod can be applied onto the piston and the piston rod via the connecting elements by rotating the first tool element against the second tool element.

15 Claims, 2 Drawing Sheets

TOOL FOR SCREWING A PISTON ONTO THE PISTON ROD OF A HYDRAULIC CYLINDER AND HYDRAULIC CYLINDER

CROSS REFERENCE TO RELATED APPLICATION

This application claims priority to German Utility Model Application No. 20 2008 008 446.6, filed Jun. 24, 2008, which is hereby incorporated by reference in its entirety for all purposes.

TECHNICAL FIELD

The present invention relates to a tool for screwing a piston onto the piston rod of a hydraulic cylinder and to a corresponding hydraulic cylinder. The hydraulic cylinder advantageously is the hydraulic cylinder of a working machine, in particular a hydraulic cylinder for moving a working device of a working machine. For instance, the hydraulic cylinder can be used in a hydraulic excavator for moving the excavator arm. With a particularly advantageous effect, the present invention is used in hydraulic cylinders with a piston diameter between 200 mm and 500 mm.

BACKGROUND AND SUMMARY

Nowadays, the connection between the piston rod and the piston of a hydraulic cylinder usually is tightened with a specified angle of rotation. However, the specified angles of the threaded connection, in particular with piston sizes having a piston diameter of 200 mm and more, only can be achieved with very high tightening torques.

Nowadays, the connections between piston rod and piston therefore usually are tightened and released with great stationary tightening machines, wherein the piston rod is clamped on the side facing away from the piston and the piston is tightened by the tightening machine. Furthermore, screw-on wrenches are known, which are moved with a sledgehammer. The connections often are hardly tightened or only insufficiently, since the necessary torque cannot be applied.

On the whole, no satisfactory solution is known so far, by means of which the screw connection between piston and piston rod can be achieved with the necessary tightening torques, in particular in harsh usage on the construction site.

Therefore, it is the object of the present invention to provide a tool for screwing a piston onto the piston rod of a hydraulic cylinder, by means of which the necessary tightening torques can be applied with easy manageability at the same time. Furthermore, it is the object of the present invention to provide a hydraulic cylinder, for which the tool of the invention can be used.

This object is solved, in one example, by a tool for screwing a piston onto the piston rod of a hydraulic cylinder, in particular of a hydraulic cylinder with a piston diameter of more than 200 mm, including a first tool element with connecting elements for releasable connection with the piston and a second tool element with connecting elements for releasable connection with the piston rod, which is rotatable with respect to the first tool element. By rotating the first tool element against the second tool element, the torque necessary for screwing together piston and piston rod can be applied onto the piston and the piston rod via the connecting elements. Advantageously, the first tool element is rotatably mounted on the second tool element. Mounting the first tool element on the second tool element can be effected either directly or via one or more intermediate elements. The bearing allows a rotary movement between the first and the second tool element about an axis of rotation which corresponds to the axis of rotation of the screw connection between piston and piston rod, when the tool is connected with piston and piston rod.

In accordance with the invention, a tool is provided, by means of which the piston can be screwed onto the piston rod of the hydraulic cylinder safely and comfortably, wherein the necessary tightening torques can be applied in a controlled way. There is provided a mobile tool, which represents an economic alternative to existing stationary tightening machines. In particular, the tool can easily and comfortably be used on the construction site. The connecting elements of the tool engage the piston rod on the piston side, in particular they engage mating connectors arranged on the piston side. In particular, the advantage is obtained that the piston rod no longer must be fixed on the side facing away from the piston, since the second tool element engages the piston rod on the piston side. In this way, a compact tool can be provided, which can easily be transported and handled by a single operator.

Advantageously, the connecting elements engage the end faces of piston and/or piston rod. In this way, the tool can be designed extremely compact. The piston usually includes a through-bore, into which the piston rod is screwed, so that the piston-side end face of the piston rod is accessible. On this piston-side end face of the piston rod, mating connectors advantageously are provided, which are engaged by the connecting elements of the tool.

Advantageously, the connection of the connecting elements with piston and/or piston rod is effected by positive connection. In this way, a safe connection is obtained, by which high tightening torques can be transmitted.

Advantageously, the connecting elements comprise studs which can be inserted into recesses in the piston and/or piston rod, wherein inserting advantageously is effected axially. In this way, the tool can easily be connected with the piston and/or piston rod, in that it is advantageously pushed onto the piston and/or piston rod in axial direction. Advantageously, the tool can be pushed onto the piston and the piston rod at the same time, so that the connection between the tool and the piston and piston rod is effected in a single step.

Advantageously, the tool of the invention furthermore includes a power device, in particular a transmission, especially a spindle transmission, by means of which the rotary movement between the first tool element and the second tool element can be produced. The power device thus generates the high torques necessary for tightening piston and piston rod, which are applied onto piston and piston rod via the first and second tool elements.

Advantageously, the power device includes a connecting element, via which it can be driven by means of any kind of external drive, in particular an electric screwdriver. The power device, in particular in the form of a transmission, especially in the form of a spindle transmission, thus can easily be driven via an external drive, so that the tool itself can do without a drive. In this way, the tool can again be configured compact and at low cost, wherein the drive is effected by drives anyway present on construction sites, such as by an electric screwdriver. For moving the lever arms, any kind of power devices can be used. For instance, a hydraulic cylinder driven with a small compact unit can be employed advantageously. What might also be used for instance are electrohydraulic cylinders or pneumatic cylinders or any other linear drive.

Advantageously, the first tool element and the second tool element include lever arms, via which the torque is introduced into the first tool element and the second tool elements. In this way, a high torque can be produced by the leverage of the lever arms.

Advantageously, a power device, in particular a spindle transmission, is provided between the lever arms of the first and second tool elements, via which the torque is produced. In this way, a compact arrangement is obtained, by means of which high tightening torques can be produced in a controlled way. In particular, the use of a spindle transmission provides for controlled tightening with high tightening torques, without a particularly powerful drive being necessary for this purpose.

Furthermore advantageously, the tool of the invention includes one or more adapters, by means of which the tool can be used for different pistons and/or piston rods. The adapter advantageously is connected with the connecting elements of the tool and itself includes connecting elements, by means of which the adapter can releasably be connected with the piston and the piston rod of the hydraulic cylinder. The adapter transmits the torques necessary for tightening piston and piston rod also to those hydraulic cylinders which have mating connectors which are not compatible with the connecting elements provided on the tool.

The present invention furthermore comprises a hydraulic cylinder with a piston rod and a piston screwed onto the piston rod, in particular a hydraulic cylinder with a piston diameter of more than 200 mm, wherein piston and piston rod include mating connectors for releasable connection with the connecting elements of a tool for screwing the piston, in particular mating connectors for releasable connection with the connecting elements of a tool as shown above. In such a hydraulic cylinder, the tool of the invention accordingly can be used for easily and reliably tightening the piston on the piston cylinder.

The present invention furthermore comprises a piston rod for a hydraulic cylinder as shown above with piston-side mating connectors for releasable connection with the connecting elements of a tool for screwing the piston. Furthermore the device comprises a piston for a hydraulic cylinder as described above with mating connectors for releasable connection with the connecting elements of a tool for screwing the piston. By means of the piston-side mating connectors on the piston rod and the mating connectors on the piston, the mobile tool of the invention can safely and easily be used in accordance with the invention for mounting a new piston on a piston rod for instance on a construction site.

In the hydraulic cylinder, the piston rod or the piston, the connection between the connecting elements and the mating connectors advantageously is effected by positive connection. Connections via which the necessary high torques can be transmitted thus can be produced with simple constructive means.

Advantageously, the mating connectors are arranged on the end faces of the piston rod and/or piston. In this way, a relatively small-size tool can be used, which merely must engage the end faces of piston rod and piston.

Furthermore advantageously, the mating connectors comprise recesses in which the connecting elements of the tool can positively be inserted, wherein inserting advantageously is effected axially. In this way, the releasable connections between tool and piston and piston rod can be produced quickly and yet safely.

The present invention furthermore comprises an adapter for a tool as shown above, by means of which the tool can be used for different pistons and/or piston rods. The adapter thus allows mounting different hydraulic cylinders with only one tool, in that the adapter provides the connecting elements necessary for the mating connectors on the respective piston or on the respective piston rod.

The adapter includes first and second adapter elements, which are rotatable against each other. Advantageously, the two adapter elements rotatably rest against each other. The adapter includes mating connectors for connection with the connecting elements of the tool and connecting elements for connection with the mating connectors of the piston and the piston rod. The first adapter element carries the mating connectors for connection with the connecting elements of the first tool element and the connecting elements for connection with the mating connectors of the piston, whereas the second adapter element carries the mating connectors for connection with the connecting elements of the second tool element and the connecting elements for connection with the mating connectors of the piston. The mating connectors of the adapter can constitute recesses in which engage the connecting elements of the tool. The connecting elements of the adapter can constitute studs which engage in the mating connectors constituting a recess in the piston and piston rod.

There can be provided a plurality of adapters which allow to employ the tool of the invention with a plurality of different hydraulic cylinders.

Furthermore, the present invention comprises a working machine, in particular a traveling working machine, in particular a construction machine, in particular a hydraulic excavator, with at least one hydraulic cylinder in accordance with the invention.

BRIEF DESCRIPTION OF FIGURES

The present invention will now be explained in detail with reference to embodiments and drawings, in which.

DETAILED DESCRIPTION

Figures 1A, 1B, 1C:
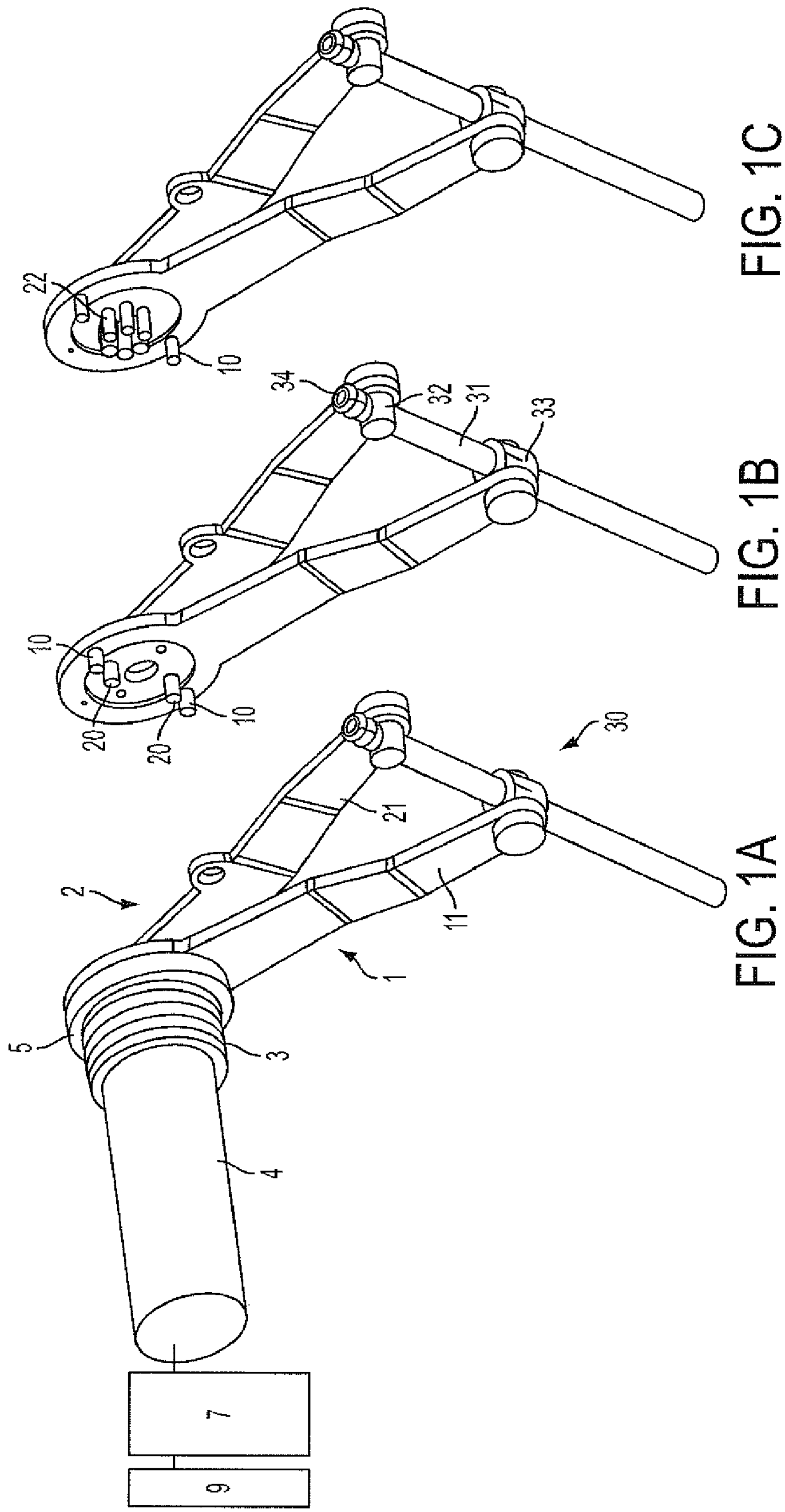
FIG. 1*a*: shows an embodiment of the hydraulic cylinder of the invention with a first embodiment of the tool of the invention, wherein an embodiment of the adapter of the invention is used.
FIG. 1*b*: shows the first embodiment of the tool of the invention.
FIG. 1*c*: shows a second embodiment of the tool of the invention.

A first embodiment of the tool of the invention for screwing a piston 3 onto the piston rod 4 of a hydraulic cylinder 7 of a working machine 9, such as traveling working machine (e.g., a hydraulic excavator) is shown in FIGS. 1*a* and 1*b*. The tool includes a first tool element 1 with connecting elements 10 for releasable connection with the piston 3 and a second tool element 2 with connecting elements 20 for releasable connection with the piston rod 4, which is rotatable with respect to the first tool element 1. The connecting elements 10 and 20 are studs which can axially be inserted into corresponding bores on piston and piston rod. Via the connecting elements 10 and 20, a positive connection between the first tool element 1 and the piston or between the second tool element 2 and the piston rod 4 thus can be produced, via which the torques necessary for tightening the piston on the piston rod can be transmitted. The mating connectors on the piston 3 and the piston rod 4 are arranged on the piston-side end faces of piston rod and piston, so that the tool can easily be pushed onto piston and piston rod in axial direction.

The second tool element 2 includes a disk-shaped connecting plate, on which the connecting elements 20 are arranged, and the first tool element 1 likewise includes a disk-shaped connecting plate, on which the connecting elements 10 are arranged. The connecting plate of the first tool element 1 has the shape of an annular disk and includes a central opening through which the connecting elements 20 on the connecting disk of the second tool element 2 extend. The connecting disk of the second tool element 2 also is guided in this opening.

The first tool element 1 is rotatably mounted on the second tool element 2, so that after connecting the tool with piston and piston rod, the torque necessary for screwing together piston 3 and piston rod 4 can be applied onto the piston and the piston rod by rotating the first tool element 1 against the second tool element 2. The tool element 1 is rotated with respect to the second tool element 2 by means of a power device 30, whereby the connecting elements 10 also are rotated with respect to the connecting elements 20 and thus tighten the piston on the piston rod. In the embodiment, a spindle transmission is provided as power device 30. The spindle transmission includes a threaded rod 31, which is rotatably mounted on a bearing 32. On the threaded rod 31, the spindle nut 33 is arranged, which thus is moved along the threaded rod 31 by rotating the same. The transmission of the force produced by moving the spindle transmission is effected via a lever arm 11 of the first tool element 1 and a lever arm 21 of the second tool element 2. The bearing 32 for the threaded rod 31 is arranged on the one lever arm, the spindle nut 33 on the other lever arm. The bearing 32 and the spindle nut 33 each are rotatably mounted on the lever arms about a hinge axis extending vertical to the threaded rod. Since the spindle nut 33 is pivotally mounted on the lever arm 11, a rotary movement of the spindle 33 about the axis of the threaded rod 31 is prevented.

For driving the spindle transmission, a connecting element 34 is provided, via which the spindle can be driven by means of an external drive, e.g. by means of an electric screwdriver. Depending on the driving direction, the connection between piston and piston rod can either be opened or closed.

In the first embodiment of the tool, the connecting elements 10 and 20 on the tool each comprise studs which are arranged vertical to the axis of rotation of the first and second tool elements and are located opposite each other with respect to the axis of rotation. Alternatively, any other connecting means also are conceivable. FIG. 1*c* shows a second embodiment of the tool of the invention, in which instead of two studs a hexagon contour 22 is provided on the tool element 2, which engages in an internal hexagon on the cylinder rod. However, other geometries, e.g. in the form of teeth, inner or outer contours, also are possible. Likewise, other geometries are also conceivable for the connecting elements 10 on the first tool element 1.

Figure 2:
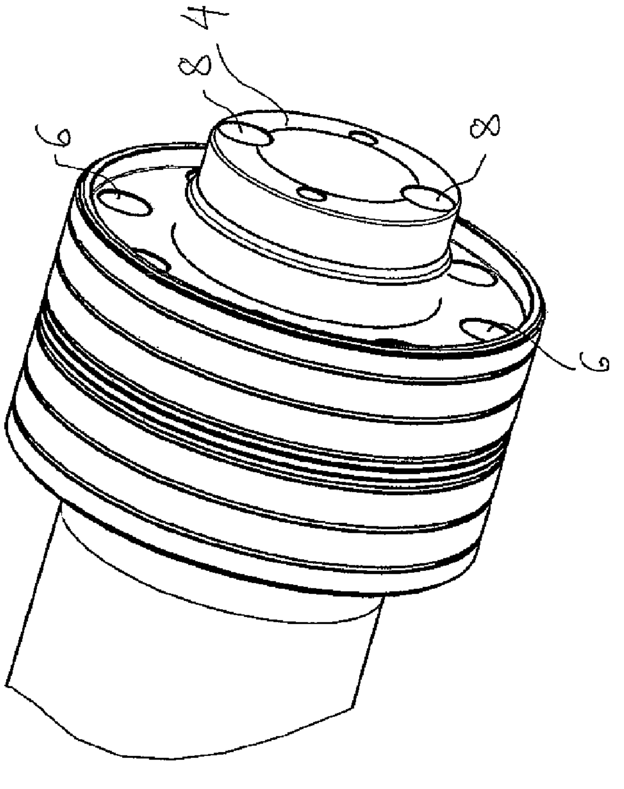
FIG. 2: shows the embodiment of the piston of the invention in a perspective view with a view onto the end face of piston and piston rod.

FIG. 2 now shows the embodiment of the piston 3 and the piston rod 4 of the invention in a perspective view which shows the respective piston-side end faces. There can be seen the mating connectors 6 on the piston and the mating connectors 8 on the piston rod, which serve the releasable connection with the connecting elements 10 and 20 on the tool in accordance with the invention. The mating connectors 6 and 8 are recesses into which the connecting elements can axially be inserted. For this purpose, the mating connectors each are arranged on the end faces of piston and piston rod. The connecting elements 10 of the first tool element 1, which are arranged on the outside, are inserted into the mating connectors 6 on the piston, and the connecting elements 20 on the second tool element 2, which are arranged on the inside, are inserted in the mating connectors 8 on the end face of the piston rod. By rotating the connecting elements 10 on the first tool element 1 and the connecting elements 20 on the second tool element 2, the piston 3 can then be screwed onto the piston rod 4 or be unscrewed from the same.

To facilitate fitting of the tool on piston and piston rod, a plurality of mating connectors 6 and 8 distributed around the periphery also are conceivable as an alternative to the arrangement shown in FIG. 2, so that the elements 1 and 2 each are connectable with piston and piston rod in different positions. The same can be achieved in that like in the embodiment of the tool shown in FIG. 1*c* a contour with a multidirectional symmetry is used, so that with a firm position of piston 3 and piston rod 4 a plurality of positions of the tool elements 1 and 2 with respect to each other are possible, in which a connection between tool, piston and piston rod is possible.

Figure 3:
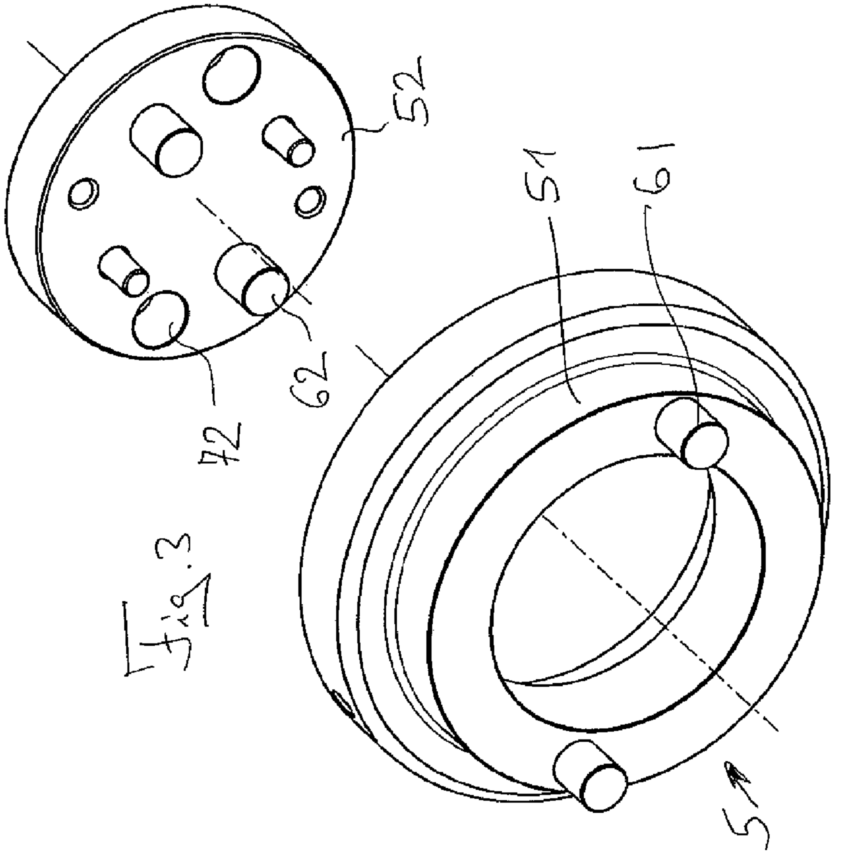
FIG. 3: shows the embodiment of the adapter of the invention in a perspective view.

To apply the same tool to pistons and piston rods with different mating connectors or with different size, the present invention furthermore comprises an adapter. The adapter 5 is shown in FIG. 3. The adapter comprises a first adapter element 51, which is connectable with the first tool element 1. Furthermore, the adapter comprises a second adapter element 52, which is connectable with the second tool element via the mating connectors 72. For this purpose, the connecting elements 10 and 20 each are inserted into the mating connectors 72. The adapter elements furthermore include connecting elements 61, 62, via which the connection with the piston or piston rod is produced. In the embodiment, the connecting elements 61 and 62 are inserted into the mating connectors 6, 8 on piston and piston rod.

The first adapter element 51 in turn has the shape of an annular disk and includes a circular recess in its middle, in which the second adapter element 52 is rotatably inserted. The use of the adapter between piston and piston rod and tool is also illustrated in FIG. 1.

By means of the tool of the invention or the hydraulic cylinder of the invention with the corresponding piston or the corresponding piston rod, high controlled tightening torques can be produced in a both safe and simple way. In this way, an economic alternative to existing tightening machines is provided, which in particular is characterized in that an inexpensive mobile tool of simple construction is provided for screwing the piston onto the piston rod.

The present invention particularly advantageously is used in hydraulic cylinders which have a piston diameter between 200 and 500 mm. In particular, it is used for hydraulic cylinders of working machines, in particular of mobile working machines such as traveling construction machines. Particularly advantageously, it can be used e.g. in hydraulic excavators.

However, the tool in accordance with the invention also can generally be used for tightening large screw connections, when the parts to be screwed to each other include mating connectors, via which they can be connected with the connecting elements of the tool of the invention. For this purpose, corresponding adapters can also be provided.

The invention claimed is:

1. A tool for screwing a piston onto a piston rod of a hydraulic cylinder comprising:

a first tool element with connecting elements for releasable connection with the piston; and a second tool element for releasable connection with mating connectors on the piston rod, which is rotatable with respect to the first tool element, wherein a torque necessary for screwing together the piston and piston rod can be applied onto the piston and the piston rod via the connecting elements by rotating the first tool element against the second tool element.

2. The tool according to claim 1, wherein the connecting elements engage an end face of the piston and/or piston rod, and wherein the first tool element is rotatably mounted on the second tool element.

3. The tool according to claim 1, wherein the connection of the connecting elements with the piston and/or piston rod is effected by positive connection.

4. The tool according to claim 3, wherein the connecting elements comprise studs which can be inserted into recesses on the piston and/or the piston rod.

5. The tool according to claim 1, further comprising a power device by means of which rotary movement between the first tool element and the second tool element is produced.

6. The tool according to claim 5, wherein the power device includes a connecting element, via which it can be driven by means of an external drive, wherein a piston diameter of the hydraulic cylinder is more than 200 mm, and wherein the inserting is effected axially, and wherein the power device is a spindle transmission.

7. The tool according to claim 1, wherein the first tool element and the second tool element include lever arms, via which the torque is introduced into the first tool element and the second tool element.

8. The tool according to claim 7, wherein a power device is provided between the lever arms of the first and second tool elements, via which the torque is produced.

9. The tool according to claim 1, further comprising one or more adapters, by means of which the tool can be applied to different pistons and/or piston rods, and wherein the hydraulic cylinder is a hydraulic cylinder of an excavator.

10. A hydraulic cylinder with a piston rod and a piston screwed onto the piston rod, the hydraulic cylinder with a piston diameter of more than 200 mm, wherein the piston and piston rod include mating connectors for releasable connection with connecting elements of a tool for screwing the piston, the mating connectors for releasable connection with the connecting elements of the tool including a first tool element with connecting elements for releasable connection with the piston; and a second tool element for releasable connection with the piston rod, which is rotatable with respect to the first tool element, wherein a torque necessary for screwing together the piston and piston rod can be applied onto the piston and the piston rod via the connecting elements by rotating the first tool element against the second tool element.

11. The hydraulic cylinder according to claim 10, further comprising mating connectors for releasable connection with the connecting elements of the tool.

12. The hydraulic cylinder according to claim 10, wherein the connection between the connecting elements and mating connectors is effected by positive connection.

13. The hydraulic cylinder according to claim 10, wherein the mating connectors are arranged on an end face of the piston rod and/or piston and/or the mating connectors comprise recesses, in which the connecting elements are configured to be positively inserted, wherein the inserting is effected axially.

14. A traveling working machine, comprising:

a hydraulic cylinder with a piston rod and a piston screwed onto the piston rod, the hydraulic cylinder with a piston diameter of more than 200 mm, wherein the piston and piston rod include mating connectors for releasable connection with connecting elements of a tool for screwing the piston, the mating connectors for releasable connection with the connecting elements of the tool including a first tool element with connecting elements for releasable connection with the piston; and a second tool element for releasable connection with the piston rod, which is rotatable with respect to the first tool element, wherein a torque necessary for screwing together the piston and piston rod can be applied onto the piston and the piston rod via the connecting elements by rotating the first tool element against the second tool element.

15. The traveling working machine according to claim 14, wherein the working machine is a hydraulic excavator.

* * * * *